United States Patent
Dugan

Patent Number: 5,899,218
Date of Patent: * May 4, 1999

[54] PLATE-TYPE VALVE AND METHOD OF USE

[75] Inventor: Jeffrey S. Dugan, Asheville, N.C.

[73] Assignee: BASF Corporation, Mt. Olive, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/786,212

[22] Filed: Jan. 21, 1997

Related U.S. Application Data

[62] Division of application No. 08/496,170, Jun. 28, 1995, abandoned.

[51] Int. Cl.⁶ ............................................. F16K 31/02
[52] U.S. Cl. .................. 137/1; 251/129.01; 251/129.02; 251/129.06; 251/11; 137/527; 137/855
[58] Field of Search .............................. 137/1, 855, 527; 251/129.01, 129.02, 129.06, 30.05, 11

[56] References Cited

U.S. PATENT DOCUMENTS

| | | |
|---|---|---|
| 3,057,376 | 10/1962 | Agutter et al. . |
| 4,099,544 | 7/1978 | Itakura . |
| 4,585,209 | 4/1986 | Aine ................................... 251/129.02 |
| 4,619,438 | 10/1986 | Coffee ................................ 251/129.01 |
| 4,768,751 | 9/1988 | Giachino et al. . |
| 4,886,093 | 12/1989 | Itakura . |
| 4,923,169 | 5/1990 | Grieb et al. . |
| 4,951,617 | 8/1990 | Linamen . |
| 5,029,805 | 7/1991 | Albarda et al. . |
| 5,065,978 | 11/1991 | Albarda et al. . |
| 5,096,643 | 3/1992 | Kowanz et al. . |
| 5,105,849 | 4/1992 | Clough . |
| 5,142,781 | 9/1992 | Mettner . |
| 5,144,982 | 9/1992 | Willbanks . |
| 5,176,358 | 1/1993 | Bonne ................................. 251/30.05 |
| 5,176,359 | 1/1993 | Leveson et al. . |
| 5,228,468 | 7/1993 | Kapadia . |
| 5,370,156 | 12/1994 | Peracchio . |
| 5,406,976 | 4/1995 | Kapadia . |
| 5,413,142 | 5/1995 | Johnson . |
| 5,619,177 | 4/1997 | Johnson ............................. 251/129.01 |

Primary Examiner—Denise L. Ferensic
Assistant Examiner—Ramyar Farid

[57] ABSTRACT

A plate-type valve and method of using same to control fluid flow are disclosed, wherein the plate-type valve contains:

a first valve plate having a first channel formed therein;

a second valve plate having a second channel formed therein and a valve seating portion;

a flexible member having a movable free end and being disposed between the first channel and the second channel, the movable free end of the flexible member being disposed for movement onto and off of the valve seating portion by means of an actuating force such that movement of the movable free end onto the valve seating portion prevents fluid flow between the first channel and the second channel and movement of the movable free end off of the valve seating portion allows fluid flow between the first channel and the second channel.

5 Claims, 4 Drawing Sheets

5,899,218

PLATE-TYPE VALVE AND METHOD OF USE

This application is a division of application Ser. No. 496,170, filed on Jun. 28, 1995 now abandoned on Jul. 22, 1997.

BACKGROUND OF THE INVENTION

This invention relates to a valve. More particularly, this invention relates to a plate-type valve and a method of using same to control the flow of fluid.

Generally, on/off and volume control of fluid flow between channels is accomplished by means of valve systems having a complex configuration requiring precisely machined connections between a valve seat and a movable valve stem. Fluid flow valves having a plate-like configuration, on the other hand, have also been used to control fluid flow and are believed to have a simpler structure than the conventional valves with precisely machined parts. However, present plate-type valves can also contain relatively complex structures and, as such, can be expensive and time-consuming to make, clean, inspect, re-use and/or replace, and, thus, not offer sufficient advantages over the conventional seat/stem configured valves. It is therefore continually desirable to simplify the structure of plate-type valve systems.

Fluid-control plate-type valve systems are disclosed, for example, in U.S. Pat. Nos. 5,176,359; 5,065,978; 5,029,805; 5,228,468; 4,923,169; 5,096,643; 4,768,751; 3,057,376; and 5,144,982.

The valves disclosed in the foregoing references tend to be overly complicated structures containing numerous separately made parts. The manufacture of each part followed by the combining of the parts into the final valve structure can be both time-consuming and expensive. The frequently bulky nature of the prior plate-type valves can make cleaning, inspecting and re-using the valve difficult and time-consuming. Unfortunately, the costs associated with manufacturing such plate-type valves make disposal and/or replacement of the valves unattractive alternatives. In addition, the conglomerate nature of the prior plate-type valves tends to cause undesired wearing of the individual parts, thus requiring replacement of the worn parts. Furthermore, none of the references cited hereinabove discloses a plate-type valve which is capable of being actuated by a plurality of forces, e.g., fluid pressure, magnetic force and temperature change.

An object of the present invention is to provide a plate-type valve composed of parts which can be formed from one or two basic bodies.

A further object of the present invention is to provide a plate-type valve which is less bulky and less expensive to manufacture, inspect, clean, re-use and replace than prior valves.

An additional object of the present invention is to provide a plate-type valve which is capable of being actuated by a plurality of forces.

A further object of the present invention is to provide a plate-type valve which can be actuated by means of fluid pressure, magnetic force, or temperature change.

A still further object of the present invention is to provide a method of controlling fluid flow by means of a plate-type valve having the characteristics set forth in the preceding objects.

These and other objects which are achieved according to the present invention can be readily discerned from the following description.

SUMMARY OF THE INVENTION

The present invention provides a plate-type valve, containing:

a first valve plate having a first channel formed therein;

a second valve plate having a second channel formed therein and a valve seating portion;

a flexible member having a movable free end and being disposed between the first channel and the second channel, the movable free end of the flexible member being disposed for movement onto and off of the valve seating portion by means of an actuating force such that movement of the movable free end onto the valve seating portion prevents fluid flow between the first channel and the second channel and movement of the movable free end off of the valve seating portion allows fluid flow between the first channel and the second channel.

The valve of this invention can be actuated by a plurality of actuating forces, including fluid pressure, magnetic force and temperature change.

In embodiments of the valve of this invention where the actuating force involves fluid pressure or magnetic force, the flexible member is made up of a first flexible element integral with the first valve plate. In embodiments where the actuating force is temperature change, the flexible member is a composite containing a first flexible element attached to a second flexible element which is non-integral with the first valve plate, the first and second flexible elements being respectively composed of first and second materials having different thermal expansion coefficients.

The present invention is also directed to a method of controlling fluid flow by means of the plate-type valve of this invention. The method of this invention generally involves providing an actuating force against the free end of the flexible member to either move the free end onto the valve seating portion so as to prevent fluid flow between the first channel and the second channel or to move the free end off of the valve seating portion so as to permit fluid flow between the first channel and the second channel.

The various parts of the valve of this invention are preferably formed from 1–3 basic bodies, depending on the particular embodiment of the valve. For example, the first channel and the flexible member in fluid pressure-actuated and magnetic-actuated valve embodiments and the first flexible element in temperature-actuated valve embodiments are preferably formed from a first basic body, e.g., a thin plate, while the valve seating portion is preferably formed from a second basic body, e.g., a second thin plate. As a result, the valve of this invention tends to be less bulky and less expensive to manufacture, inspect, clean, re-use and replace than are prior plate-type valves.

DETAILED DESCRIPTION OF THE INVENTION

Figure 1:
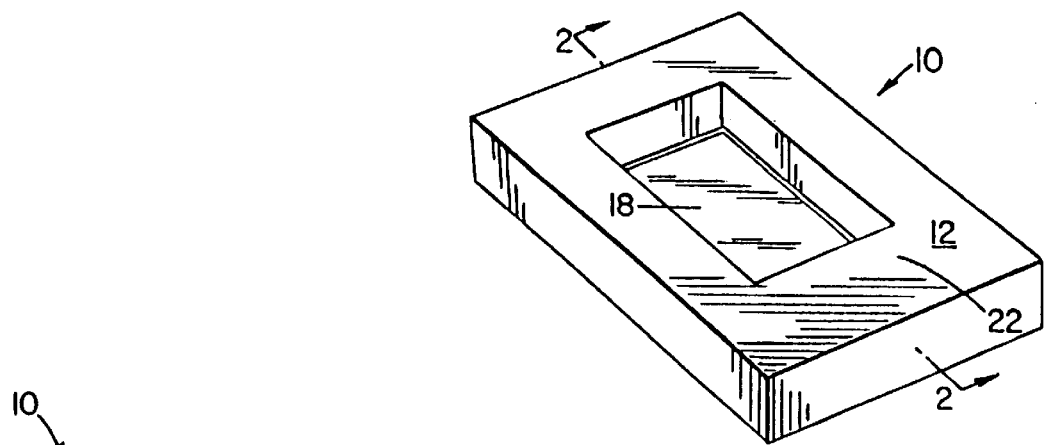
FIG. 1 is a longitudinal cross-section of the first valve plate of FIG. 2 taken along line 1—1.

The valve of this invention is composed of first and second valve plates. The first valve plate has formed therein a first channel, while the second valve plate has a second channel formed therein and contains a valve seating portion. The valve of this invention further contains a flexible member having a movable free end. Depending on the particular actuating force used, the flexible member contains either a first flexible element integral with the first valve plate or a composite containing the first flexible element attached to a second flexible element, wherein the first and second flexible elements are respectively composed of first and second materials having different thermal expansion coefficients. The first flexible element, which is integral with the first valve plate, is preferably cantilevered onto the first valve plate. The second flexible element is not integral with the first valve plate and preferably is made up of a film or plate bonded or otherwise attached to an underside surface of the first flexible element or to an underside surface of the first flexible element and of the first valve plate. The flexible member is disposed between the first channel and the second channel and has a free end which is disposed for movement onto and off of the valve seating portion. Thus, when an actuating force is applied which causes the free end of the flexible member to move onto the valve seating portion, fluid flow between the first channel and the second channel is prevented and the valve is placed in a "closed" position. When an actuating force is applied which causes the free end to move off of the valve seating portion, fluid flow between the first channel and the second channel is permitted and the valve is said to be in an "open" position.

In fluid pressure-actuated and magnetic-actuated embodiments of the valve of this invention, the flexible member is composed of the first flexible element.

In temperature-actuated embodiments of the valve of this invention, the flexible member is composed of the composite of the first and second flexible elements attached to each other. The first flexible element will be composed of a first material having a first thermal expansion coefficient while the second flexible element will contain a second material having a second thermal expansion coefficient. At one temperature, the first flexible element and the second flexible element will have identical dimensions and the movable free end of the composite flexible member will rest against the valve seating portion to close the valve. With a change in temperature, the different thermal expansion coefficients of the first and second flexible elements will cause the movable free end of the composite flexible member to bend in one direction or the other to either open the closed valve or close the opened valve.

Since the first flexible element is integral with (i.e., formed in) the first valve plate, the first flexible element and the first valve plate will be composed of the same material. On the other hand, the second flexible element is composed of a different material than the first valve plate. The second valve plate is preferably composed of the same material as the first valve plate but can be made of a different material if desired.

In preferred embodiments of the temperature-actuated valve, the valve will further contain heat exchange channels formed therein to facilitate temperature change and, therefore, actuation. The heat exchange channels are preferably formed in the composite flexible member or in the valve seating portion.

The valve seating portion may be integral with the second valve plate, or, alternatively, disposed as a non-integral structure on a face of the second valve plate. In the pressure-actuated and magnetic-actuated embodiments of the valve of this invention, the valve seating portion is preferably integral with (i.e., formed in) the second valve plate. In the temperature-actuated embodiments of the valve of this invention, if heat exchange channels are desired in the valve seating portion, the valve seating portion is preferably non-integral with the second valve plate. In other embodiments of the temperature-actuated valve, the valve seating portion is preferably integral with the second valve plate.

In the fluid-pressure actuated and magnetic-force actuated embodiments of the valve, the flexible member is preferably fully integral with the first valve plate, and the first and second valve plates are preferably stacked together in a face-to-face configuration.

In the temperature-actuated embodiments, the flexible member is composed of two flexible elements attached to each other to form a composite flexible member. The first flexible element of the composite flexible member is fully integral with the first valve plate, while the second flexible element is preferably separate and non-integral with the first valve plate. The second flexible element is preferably a film bonded or plated to the underside of the first valve plate or of the first flexible element. In preferred embodiments of the temperature-actuated valve of this invention, heat exchange channels are formed in the composite flexible member and/or in the valve seating portion.

As stated previously herein, the actuating force which opens or closes the valve of this invention can be fluid pressure, magnetic force or temperature change effected by heat exchange.

To open the valve of this invention by means of fluid pressure, a first fluid is preferably introduced into the second channel at a pressure which is sufficient to move the free end off of the valve seating portion. To close the valve, a second fluid can be introduced into the first channel at a pressure which is greater than the pressure exerted by the first fluid in the second channel, or, alternatively, fluid pressure in the second channel can be reduced relative to fluid pressure in the first channel.

When the valve of this invention is to be actuated by means of magnetic force, the first and second valve plates are both formed of a material, preferably a metal, which is permanently or reversibly charged to a negative or positive polarity. If both valve plates are charged to a like polarity, the resulting magnetic force will cause the plates to repel each other and will consequently cause the free end to be repelled away from the valve seating portion, thereby opening the valve. If the first and second valve plates are charged to opposite polarities, the resulting magnetic force will cause the plates to attract each other, and the free end will be attracted onto the valve seating portion, thereby closing the valve. When the plates are composed of a reversibly charged material, the polarity of one or both plates can be reversed as needed to open or close the valve.

As mentioned previously herein, in temperature-actuated embodiments of the valve of this invention, the flexible member is composed of first and second flexible elements attached to each other to form a composite flexible member having a composite movable free end. The first flexible element is composed of a first material having a first thermal expansion coefficient and the second flexible element is composed of a second material having a second thermal expansion coefficient, wherein the first and second thermal expansion coefficients are different. Thus, at one temperature, the first flexible element and the second flexible element will have substantially identical physical dimensions, allowing the free end of the composite flexible member to rest against the valve seating portion to close the valve. However, upon heating or cooling the first and/or second flexible elements, the respective elements will expand to different physical dimensions, resulting in a bent, open valve, wherein the free end of the composite flexible member is no longer resting against the valve seating portion.

In preferred embodiments of the temperature-actuated valve of this invention, heat exchange channels are formed in the composite flexible member and/or in the valve seating portion. The use of heat exchange channels and heat exchange fluids to heat or cool one or both of the integral surfaces of the composite flexible member provides greater control over the temperature, and therefore over the operation, of the valve.

The valve parts (i.e., the first channel, the second channel, the flexible member, and the valve seating portion) of the valve of this invention are preferably formed by a micromachining process. Non-limiting examples of suitable micromachining processes include etching, stamping, punching, pressing, cutting, molding, milling, lithographing, and particle blasting. Most preferably, the valve parts are formed by an etching process. Etching, e.g., photochemical etching, provides precisely formed parts while being less expensive than many other conventional machining processes. Furthermore, etched perforations generally do not have the sharp corners, burrs, and sheet distortions associated with mechanical perforations. Etching processes are well known in the art and are typically carried out by contacting a surface with a conventional etchant.

The first and second valve plates used in the valve of this invention are preferably thin. For example, the plates can each have a thickness of as low as 0.001 inch. Preferably, the plates each have a thickness ranging from about 0.001 inch to about 1.0 inch, and, more preferably, from about 0.01 inch to about 0.10 inch.

The flexible member has a thickness preferably ranging from about 10% to about 80%, more preferably from about 20% to about 50%, and most preferably ranging from about 20% to about 30%, of the thickness of the first valve plate.

At least a portion of the flexible member in the valve of this invention is "integral" with the first valve plate, that is, at least a portion of the flexible member is formed from the first valve plate. Preferably, the integral portion of the flexible member is cantilevered on the first valve plate. As mentioned previously herein, in temperature-actuated embodiments of the valve of this invention, the first flexible element in the composite flexible member is fully integral with the first valve plate.

The material used in the first and second valve plates will depend on the particular actuating means used for moving the free end of the flexible member. When the actuating means comprises fluid pressure, the first and second valve plates can each be composed of a metal or a non-metal so long as the flexible member is flexible. Suitable non-metals include, e.g., thermoplastic resins. Non-limiting examples of suitable metals include stainless steel, aluminum, aluminum-based alloys, nickel, iron, copper, copper-based alloys, mild steel, brass, titanium and other micromachinable metals.

When the actuating means comprises magnetic force, the valve plates are each composed of a material, preferably metal or metal alloy, which is permanently or reversibly charged to a positive or negative polarity. Non-metals rendered magnetic by chemical structure or by the inclusion of magnetic additives can also be used.

When the actuating means comprises changes in temperature, i.e., heating or cooling, the first flexible element (and the first valve plate) and the second flexible element of the composite flexible member are composed of materials, preferably metals or metal alloys, having different thermal expansion coefficients.

Non-limiting examples of suitable metals and metal alloys for use in the heat-exchange actuated embodiments of the valve of this invention include, e.g., iron, copper, chromium, tungsten, carbon-manganese alloys, chromium-molybdenum alloys, chromium-tungsten alloys, aluminum nickel cobalt alloys, iron-nickel alloys, and various grades of cobalt steel, including cobalt-chromium and cobalt-tungsten.

The valve and method of this invention can be more fully described by reference to FIGS. 1–12 herein.

Figure 2:
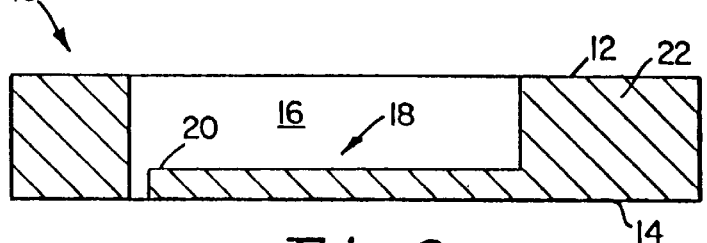
FIG. 2 is a perspective view of a first valve plate of a valve within the scope of this invention.

FIGS. 1 and 2 illustrate a first valve plate useful in the valve of this invention. Plate 10 is composed of a first facial surface 12 and an opposite second facial surface 14. Plate 10 has formed therein a first channel 16 and a flexible member 18 having a movable free end 20. Flexible member 18 is preferably cantilevered to a side block 22 of plate 10. To allow movement of free end 20, flexible member 18 is attached to plate 10 only at side block 22 and is spaced from all other side blocks in plate 10. More preferably, flexible member 18 is an integral part of plate 10. Channel 16 and flexible member 18 are preferably formed in plate 10 by means of etching, more preferably by means of double etching, wherein both surfaces 12 and 14 are etched.

Figure 3:
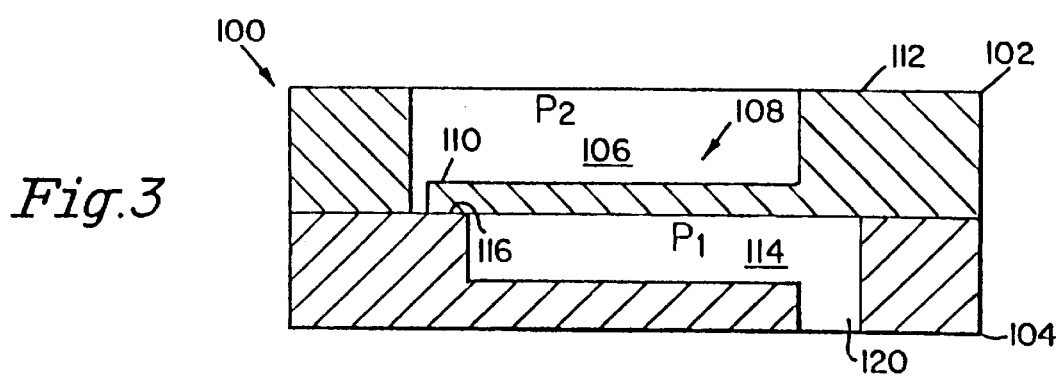
FIG. 3 is a cross-sectional view of an embodiment of a fluid pressure-actuated valve within the scope of the present invention, wherein the valve is in a closed position.
Figure 4:
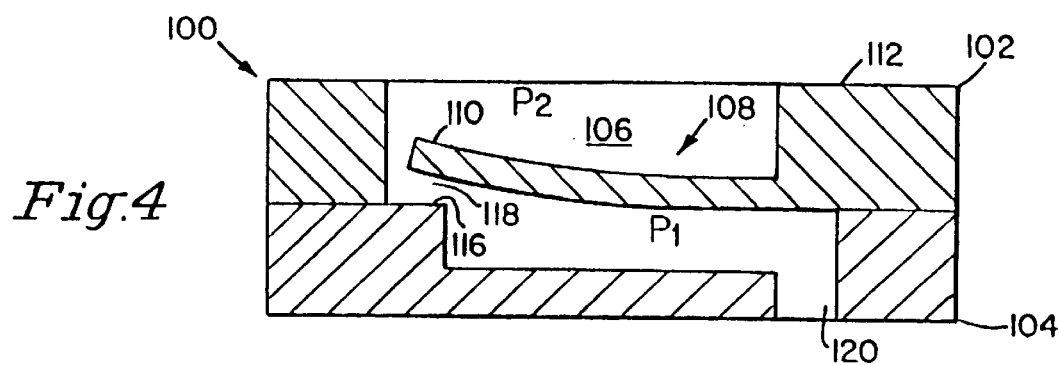
FIG. 4 is a cross-sectional view of the valve of FIG. 3, wherein the valve is in an open position.

FIGS. 3 and 4 show cross-sectional views of a first embodiment of a valve within the scope of the present invention, wherein the valve is actuated by fluid pressure. Valve 100 is shown in a closed position in FIG. 3 and in an open position in FIG. 4. Valve 100 is made up of a first valve plate 102 and a second valve plate 104 stacked together in a face-to-face configuration. First valve plate 102 is equivalent to valve plate 10 shown in FIGS. 1 and 2 and has formed therein a first channel 106 and a flexible member 108 having a movable free end 110. Flexible member 108 is preferably cantilevered onto and integral with side block 112 of plate 102. Second valve plate 104 has formed therein a second channel 114 and a valve seating portion 116 which preferably comprises the upper facial surface of second valve plate 104. In FIG. 3, free end 110 is disposed on valve seating portion 116 and thereby prevents fluid flow between channels 106 and 114. The width of channel 114 is less than the width of flexible member 108. Although not shown, valve seating portion 116 may contain a U-shaped raised lip into which free end 110 can be seated to further seal channel 106 from channel 114. Thus, in FIG. 3, valve 100 is closed. In FIG. 4, free end 110 is disposed off of valve seating portion 116 and fluid flow is permitted between channels 106 and 114, e.g., via a passageway 118. Thus, in FIG. 4, the valve is open.

In FIGS. 3 and 4, valve 100 can be actuated by means of fluid pressure. For example, in one embodiment, a first fluid (not shown) can be introduced into second channel 114, e.g., by a passageway 120 formed in plate 104. In this embodiment, the first fluid is introduced into channel 114 via passageway 120 at a first pressure P1 while a second fluid (not shown) is introduced into first channel 106 at a second pressure P2. If pressure P2 is greater than pressure P1, free end 110 will be forced onto valve seating portion 116 and the valve will be closed, as shown in FIG. 3. If pressure P1 is greater than pressure P2, free end 110 will be pushed away from valve seating portion 116 and the valve will be open, as illustrated in FIG. 4.

Figure 5:
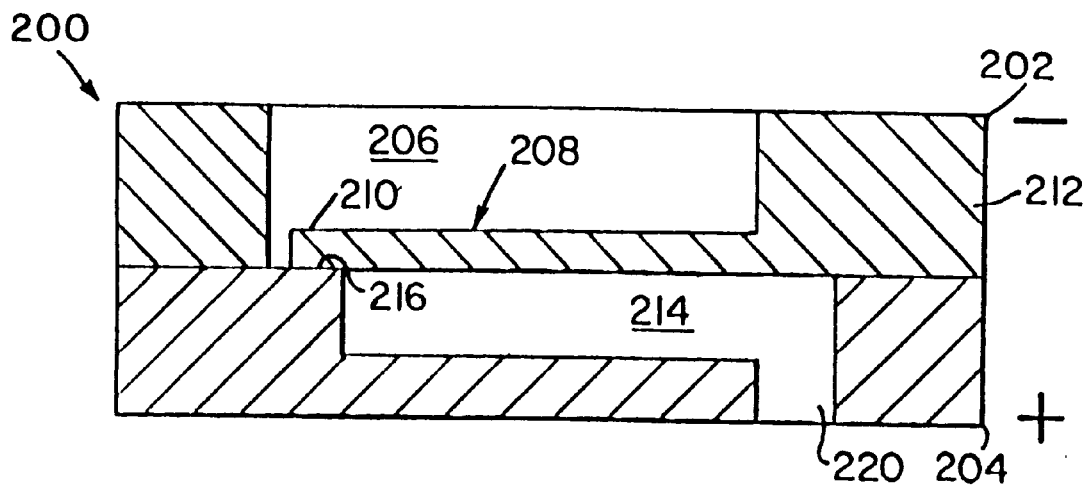
FIG. 5 is a cross-sectional view of an embodiment of a magnetic-actuated valve within the scope of the present invention, wherein the valve is in a closed position.
Figure 6:
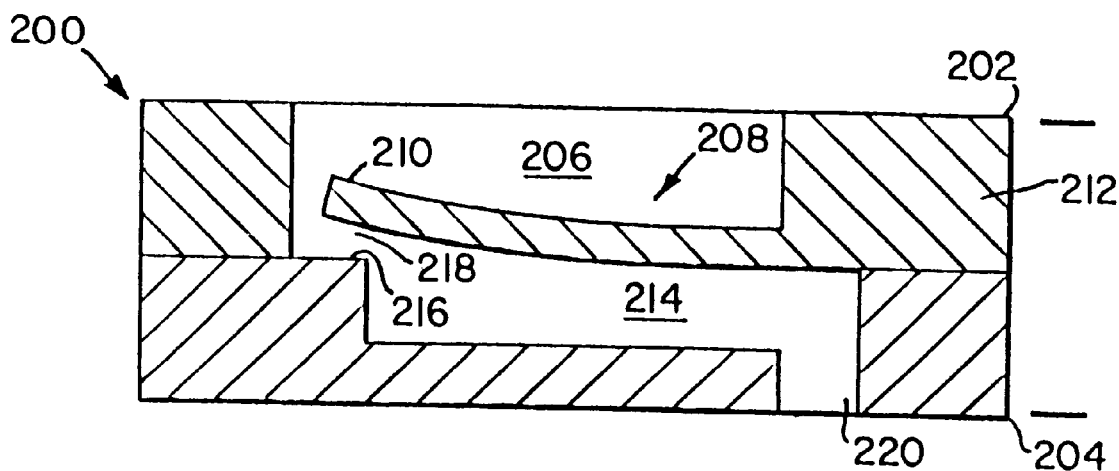
FIG. 6 is a cross-sectional view of the valve of FIG. 5, wherein the valve is in an open position.

FIGS. 5 and 6 show cross-sectional views of a second embodiment of a valve within the scope of the present invention, wherein the valve is actuated by means of magnetic force. Valve 200 is composed of first valve plate 202 and second valve plate 204. Plates 202 and 204 are each composed of a material which is permanently or reversibly charged to a positive or negative polarity. Plate 202 has formed therein a first channel 206 and a flexible member 208 having a movable free end 210. Flexible member 208 is preferably cantilevered to plate 202 at a side block 212. Second valve plate 204 has formed therein a second channel 214 and a valve seating portion 216. Second valve plate 204 may also, but need not, contain a passageway 220.

In FIG. 5, plate 202 is charged to a negative polarity while plate 204 is charged to a positive polarity. The opposite polarities of plates 202 and 204 cause the plates to be attracted to each other, which in turn causes free end 210 to move onto valve seating portion 216 to thereby close valve 200 and prevent fluid flow between channels 214 and 206. In FIG. 6, plates 202 and 204 are both charged to a negative polarity. The like polarities cause the plates to repel each other, which in turn causes free end 210 to be repelled off of valve seating portion 216 to thereby open valve 200 and permit fluid flow between channels 214 and 206 via passageway 218.

Figure 7:
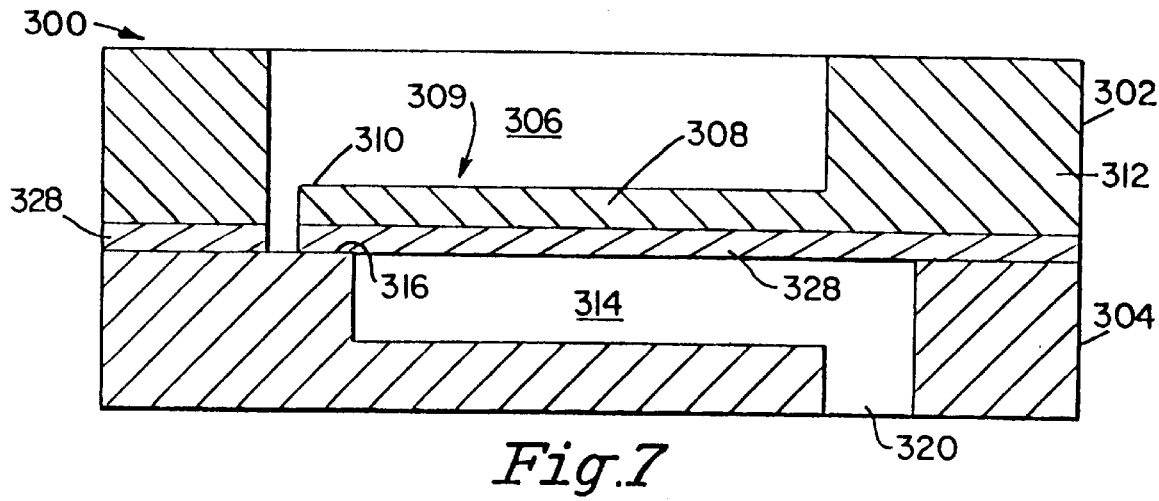
FIG. 7 is a cross-sectional view of a first embodiment of a temperature-actuated valve within the scope of the present invention, wherein the valve is in a closed position.
Figure 8:
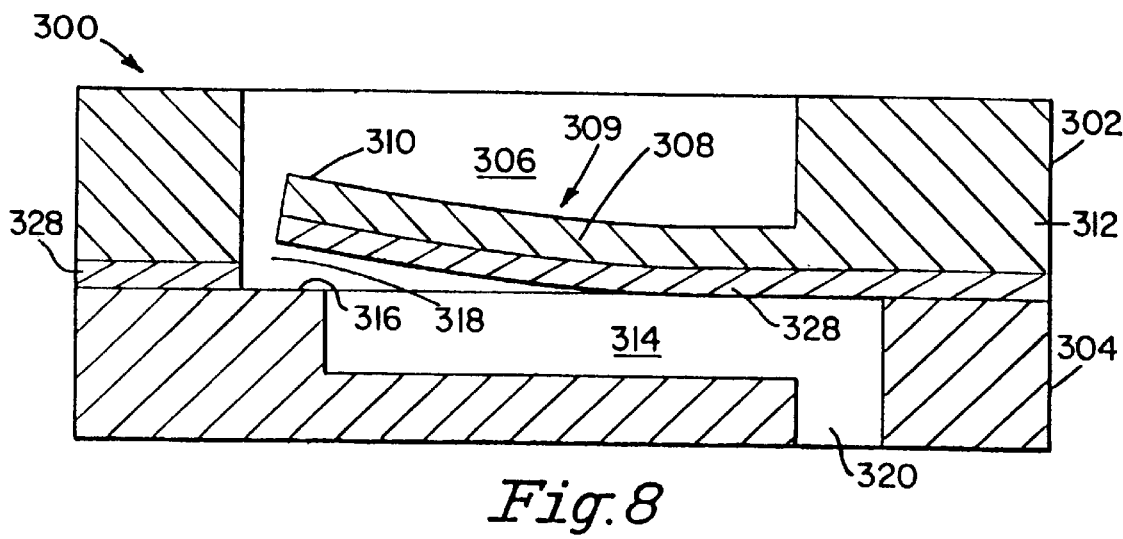
FIG. 8 is a cross-sectional view of the valve of FIG. 7, wherein the valve is in an open position.

FIGS. 7 and 8 show cross-sectional views of a third embodiment of a valve within the scope of this invention, wherein the valve is actuated by temperature change. Valve 300 is composed of a first valve plate 302, a second valve plate 304, and a composite flexible member 309 having a movable free end 310.

Plates 302 and 304 are separate plates which are preferably formed of the same material.

Plate 302 has formed therein a first channel 306, while plate 304 has formed therein a second channel 314. Composite flexible member 309 is composed of a first flexible element 308 which is preferably fully integral with plate 302, and a second flexible element 328 which is attached to plate 302 and to first flexible element 308. First flexible element 308 is preferably cantilevered to plate 302 at a side block 312 and is equivalent to flexible member 108 as shown in FIG. 3. First flexible element 308 is composed of a first material having a coefficient of thermal expansion which is different from that of the material making up second flexible element 328. Second flexible element 328 can cover the whole bottom surface of plate 302 or cover only the bottom surface of first flexible element 308. Second flexible element 328 can be brazed, plated, soldered, glued or bonded in any manner to first flexible element 308 to form composite flexible member 309.

Second valve plate 304 also has formed therein a valve seating portion 316. Second valve plate 304 may also, but need not, contain a passageway 320.

In FIG. 7, elements 308 and 328 are maintained at a temperature wherein both have identical dimensions. Thus, free end 310 rests against valve seating portion 316, thereby closing valve 300 and preventing fluid flow between channels 314 and 306. In FIG. 8, either or both of elements 308 and 328 are heated or cooled and the different thermal expansion coefficients of the materials making up the substrates cause the composite flexible member 309 to bend in one direction or another. For example, if element 328 ends up with more expansion or less contraction than element 308 in response to a change in temperature, member 309 bends upwardly, thereby opening the valve to permit fluid flow between channels 306 and 314 via passageway 318. If a temperature change causes element 308 to have greater expansion or less contraction than element 328, member 309 will bend toward valve seating portion 316, resulting in a more tightly-closed valve.

Figure 9:
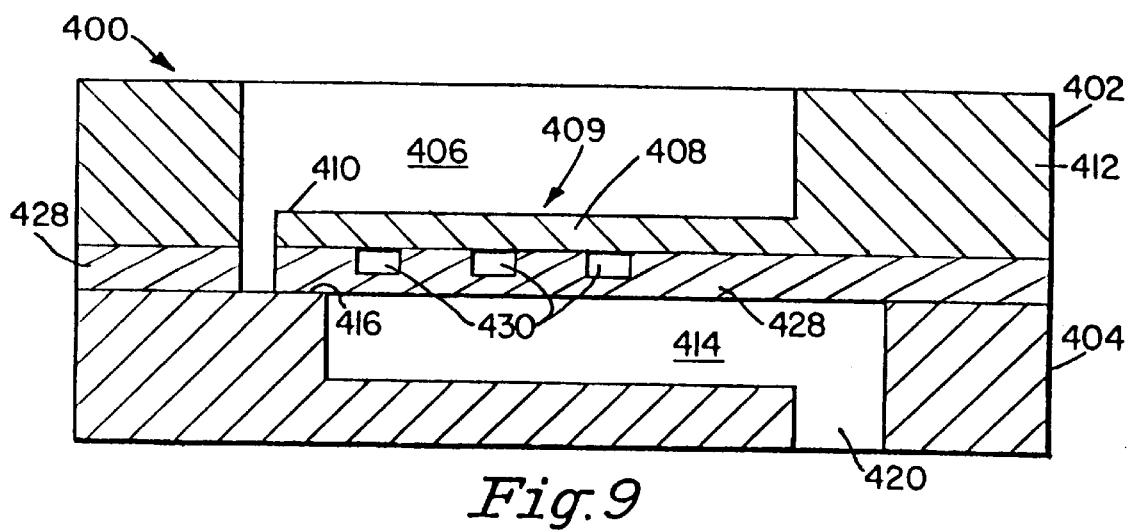
FIG. 9 is a cross-sectional view of a second embodiment of a temperature-actuated valve within the scope of the present invention, wherein the valve is in a closed position, further wherein temperature change is promoted by means of heat exchange channels formed in the composite flexible member of the valve.
Figure 10:
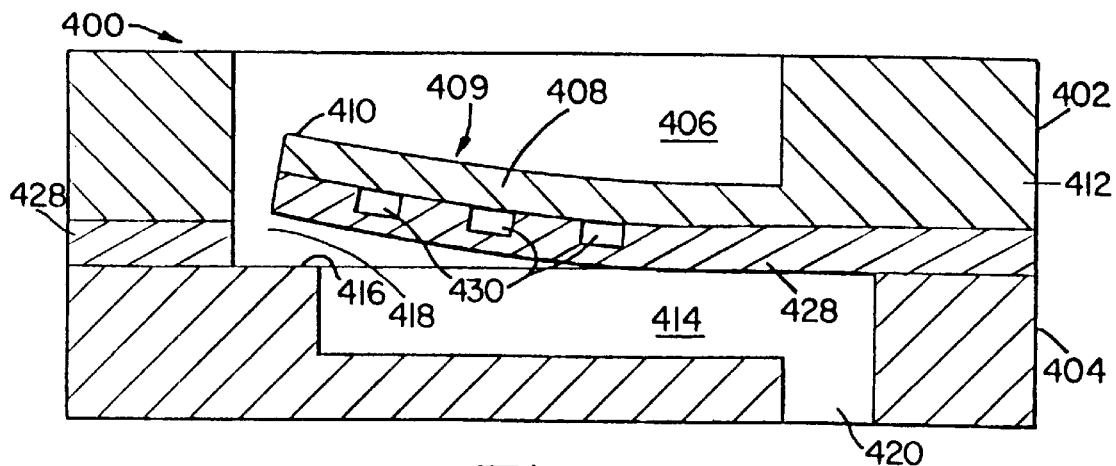
FIG. 10 is a cross-sectional view of the valve of FIG. 9, wherein the valve is in an open position.

FIGS. 9 and 10 show cross-sectional views of a second embodiment of a temperature-actuated valve within the scope of this invention, wherein the valve has heat exchange channels formed in the composite flexible member thereof.

Valve 400 is composed of a first valve plate 402, a second valve plate 404, and a composite flexible member 409 having a movable free end 410.

Plates 402 and 404 are separate plates which are preferably formed of the same material.

Plate 402 has formed therein a first channel 406, while plate 404 has formed therein a second channel 414. Composite flexible member 409 is composed of a first flexible element 408 which is preferably fully integral with plate 402, and a second flexible element 428 which is attached to plate 402 and to first flexible element 408. First flexible element 408 is preferably cantilevered to plate 402 at a side block 412 and is equivalent to flexible member 108 as shown in FIG. 3. First flexible element 408 is composed of a first material having a coefficient of thermal expansion which is different from that of the material making up second flexible element 428. Second flexible element 428 can cover the whole bottom surface of plate 402 or cover only the bottom surface of first flexible element 408. Second flexible element 428 can be brazed, plated, soldered, glued or bonded in any manner to first flexible element 408 to form composite flexible member 409.

Second valve plate 404 further has formed therein a valve seating portion 416. Second valve plate 404 may also, but need not, contain a passageway 420.

Composite flexible member 409 has formed therein heat exchange channels 430 for passage therethrough of one or more heat exchange fluids (not shown).

In FIG. 9, elements 408 and 428 are maintained at a temperature wherein both have identical dimensions. Thus, free end 410 rests against valve seating portion 416, thereby closing valve 400 and preventing fluid flow between channels 414 and 406. In FIG. 10, either or both of elements 408 and 428 are heated or cooled by means of one or more heat exchange fluids (not shown) passing through heat exchange channels 430. The different thermal expansion coefficients of the materials making up the substrates cause the composite flexible member 409 to bend in one direction or another. For example, if element 428 ends up with more expansion or less contraction than element 408 in response to a change in temperature, member 409 bends upwardly, thereby opening the valve and permitting fluid flow between channels 414 and 406 through passageway 418. If a temperature change causes element 408 to have greater expansion or less contraction than element 428, member 409 will bend toward valve seating portion 416, resulting in a more tightly-closed valve.

Figure 11:
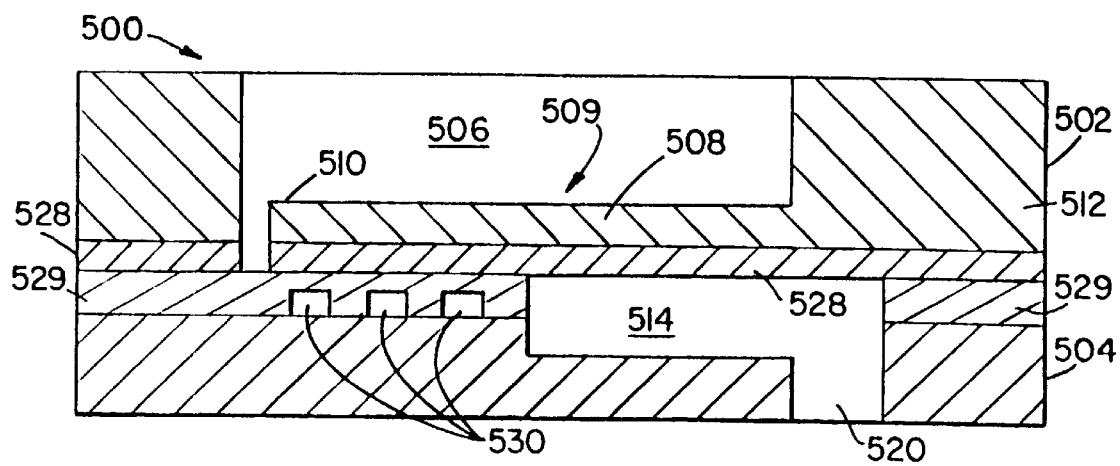
FIG. 11 is a cross-sectional view of a third embodiment of a temperature-actuated valve within the scope of the present invention, wherein the valve is in a closed position, further wherein heat exchange channels are formed in a portion therein other than the flexible member.
Figure 12:
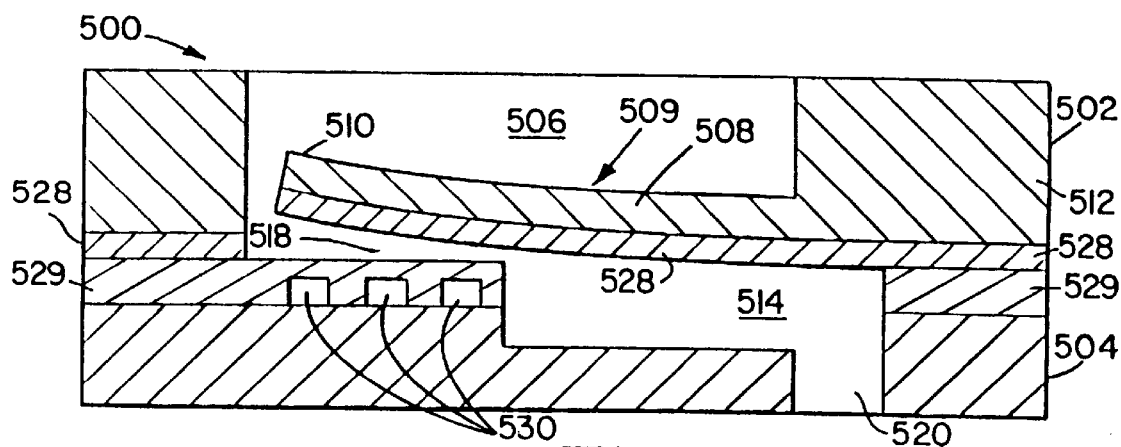
FIG. 12 is a cross-sectional view of the valve of FIG. 11, wherein the valve is in an open position.

FIGS. 11 and 12 show cross-sectional views of a third embodiment of a temperature-actuated valve within the scope of this invention, wherein the valve has heat exchange channels formed in the valve seating portion thereof.

Valve 500 is composed of a first valve plate 502, a second valve plate 504, a composite flexible member 509 having a movable free end 510, and a non-integral valve seating portion 529 disposed on plate 504.

Plates 502 and 504 are separate plates which are preferably formed of the same material.

Plate 502 has formed therein a first channel 506, while plate 504 has formed therein a second channel 514. Composite flexible member 509 is composed of a first flexible element 508 which is preferably fully integral with plate 502, and a second flexible element 528 which is attached to plate 502 and to first flexible element 508. First flexible element 508 is preferably cantilevered to plate 502 at a side block 512 and is equivalent to flexible member 108 as shown in FIG. 3. First flexible element 508 is composed of a first material having a coefficient of thermal expansion which is different from that of the material making up second flexible element 528. Second flexible element 528 can cover the whole bottom surface of plate 502 or cover only the bottom surface of first flexible element 508. Second flexible element 528 can be brazed, plated, soldered, glued or bonded in any manner to first flexible element 508 to form composite flexible member 509.

Second valve plate 504 may also, but need not, contain a passageway 520.

Valve seating portion 529 may comprise the upper facial surface of second valve plate 104 or may be a separate layer attached by known means to plate 504. Heat exchange channels may be formed in portion 529 or in an upper facial surface of plate 504. In valve 500, valve seating portion is shown as a separate layer attached to plate 504.

In FIG. 11, elements 508 and 528 are maintained at a temperature wherein both have identical dimensions. Thus, free end 510 of composite member 509 rests against valve seating portion 529, thereby closing valve 500 and preventing fluid flow between channels 514 and 506.

In FIG. 12, either or both of elements 508 and 528 are heated or cooled by means of one or more heat exchange fluids (not shown) passing through heat exchange channels 530 in valve seating portion 529. The different thermal expansion coefficients of the materials making up elements 508 and 528 cause the composite flexible member 509 to bend in one direction or another. For example, if element 528 ends up with more expansion or less contraction than element 508 in response to a change in temperature, member 509 bends upwardly, thereby opening the valve and permitting fluid flow between channels 514 and 506 through passageway 518. If a temperature change causes element 508 to have greater expansion or less contraction than element 528, member 509 will bend toward valve seating portion 529, resulting in a more tightly-closed valve.

In FIGS. 11 and 12, one way in which the valve therein may be actuated is by providing heat to the valve by means of ambient conditions, e.g., the fluid itself or another heat source, and passing a cooling fluid through the heat exchange channels, which will cause the temperature to change so as to actuate the valve.

Although the present invention has been described with reference to preferred embodiments, those skilled in the art will recognize that changes may be made in form and detail without departing from the spirit and scope of the invention.

What is claimed is:

1. A method for controlling fluid flow by means of a plate-type valve, said plate-type valve comprising:

a first valve plate having a first channel formed therein, said first valve plate being formed of a first charged material;

a second valve plate having a second channel formed therein and a valve seating portion, said second valve plate being formed of a second charged material; and a flexible member having a movable free end and being disposed between the first channel and the second channel, said flexible member being cantilevered at one end thereof to said first valve plate;

wherein the first and second plates are capable of being charred to polarities so as to provide between said flexible member and said valve seating portion (i) an electrostatic attraction force so as to cause the movable free end of the flexible member to move onto the valve seating portion, and (ii) an electrostatic repulsion force so as to cause the movable free end to move away from the valve seating portion; wherein movement of the movable free end onto the valve seating portion prevents fluid flow between the first channel and the second channel and movement of the movable free end away from the valve seating portion allows fluid flow between the first channel and the second channel;

wherein said method comprises (i) charging said first and second plates to opposite polarities to provide an electrostatic attraction force between the flexible member and the valve seating portion so as to cause the movable free end of the flexible member to move onto the valve seating portion so as to prevent fluid flow between the first channel and the second channel; and/or (ii) charging said first and second plates to like polarities to provide an electrostatic repulsion force between the flexible member and the valve seating portion so as to cause the movable free end of the flexible member to move away from the valve seating portion so as to allow fluid flow between the first channel and the second channel.

2. A method according to claim 1, wherein said valve seating portion is integral with said second valve plate.

3. A method according to claim 1, wherein said flexible member comprises a first flexible element integral with the first valve plate.

4. A method according to claim 1, wherein said first channel and said second channel are etched channels.

5. A method according to claim 1, wherein said first valve plate and said second valve plate each has a thickness of about 0.001 inch to about 1.0 inch.

* * * * *